United States Patent [19]

Meyer et al.

[11] Patent Number: 4,812,356

[45] Date of Patent: Mar. 14, 1989

[54] COATING COMPOSITION FOR FLEXIBLE SUBSTRATES AND THE USE THEREOF, AND A METHOD FOR THE PRODUCTION OF A PROTECTIVE COATING

[75] Inventors: Rainer-Leo Meyer, Sommerbergstrasse 28, D-7580 Bühl/Baden; Reinmar John, Achern; Rolf Nagel, Baden-Baden; Günter Müller, Obersasbach, all of Fed. Rep. of Germany

[73] Assignees: BGB-Gesellschaft Reinmar John; Rainer-Leo Meyer; Meyer geb. Klöffer, all of Bühl, Fed. Rep. of Germany

[21] Appl. No.: 3,404

[22] PCT Filed: May 8, 1985

[86] PCT No.: PCT/EP85/00210

§ 371 Date: Mar. 11, 1987

§ 102(e) Date: Mar. 11, 1987

[87] PCT Pub. No.: WO86/06737

PCT Pub. Date: Nov. 20, 1986

[51] Int. Cl.$^4$ .................. B05D 3/02; B32B 27/40; B32B 9/00; C08L 75/04

[52] U.S. Cl. .................. 428/220; 427/385.5; 428/423.1; 428/423.3; 428/423.7; 428/424.4; 428/424.6; 524/710; 524/773; 524/871; 524/872

[58] Field of Search .............. 524/141, 143, 306, 871, 524/872, 710, 773; 428/220, 423.1, 423.3, 423.7, 424.4, 424.6; 427/385.5

[56] References Cited

U.S. PATENT DOCUMENTS

| 3,380,950 | 4/1968 | Blomeyer | 528/83 |
| 3,919,173 | 11/1975 | Coyner et al. | 528/55 |
| 4,131,693 | 12/1978 | Wendt et al. | 524/306 |
| 4,375,521 | 3/1983 | Arnold | 524/773 |
| 4,436,784 | 3/1984 | Ehrhart | 428/423.1 |
| 4,567,230 | 1/1986 | Meyer et al. | 524/872 |

FOREIGN PATENT DOCUMENTS 2640047 3/1977 Fed. Rep. of Germany .
2848720 5/1980 Fed. Rep. of Germany .

*Primary Examiner*—Lewis T. Jacobs

[57] ABSTRACT

A one-component coating composition of
35 to 60 wt.-% isocyanate prepolymer
8 to 15 wt.-% plasticizer
0.3 to 2 wt.-% antisettling agent
2 to 10 wt.-% flaky extender
5 to 25 wt.-% colorant pigments
1 to 3 wt.-% moisture-binding agent, and
10 to 20 wt.-% aliphatic esters provides, on a flexible substrate such as artifical leather, plastic film, paper, roofing felt, polyurethane hard and soft foams, metal foils, concrete and the like, an extraordinarily elastic, tightly adherent coating film of high covering power and light resistance. Furthermore, it has good resistance to abrasion and to weathering, even to aggressive media such as sea water and chemicals.

19 Claims, No Drawings

COATING COMPOSITION FOR FLEXIBLE SUBSTRATES AND THE USE THEREOF, AND A METHOD FOR THE PRODUCTION OF A PROTECTIVE COATING

The invention relates to a coating composition for a flexible substrate, which hardens chemically on account of its content of isocyanate prepolymer or polyisocyanate. In particular the invention relates to a one-component coating composition of this kind, which in the ready-mixed state has a long shelf life if moisture is excluded, but after application to the substrate hardens by the action of moisture from the ambient atmosphere. The flexible substrates can be sheet materials, for example, which can be flexed or folded on account of their small thickness; sheet materials of this kind include, but are not limited to, metal foils, plastic films, artificial leather, paper, cardboard, roll roofing and the like. The substrates can also be hard and soft foams, and massive parts such as extrusions, pipes and other metal surfaces which are exposed to thermal expansion, as well as concrete surfaces.

The invention furthermore relates to a method for the production of a colored, highly elastic protective coating on a flexible substrate of the kind specified. Lastly, the invention relates to a variety of applications of this one-component, moisture-hardening coating composition.

Coating compositions for the production of a colored coating on a flexible substrate are known. The known coating compositions have a number of disadvantages. For example, one known coating composition has to be applied in about four coats to assure sufficient coverage. These great coating thicknesses are necessary because the basic binding agent does not permit high pigmentation, and therefore the desired shade of color can be obtained with sufficient covering power only in a plurality of coats. If the substrate is too severely bent or folded, the coating obtained from the known coating composition tends to crack and spall because the hardened coating is insufficiently elastic.

In the case of moisture-hardening one-component coating compositions containing polyisocyanate as binding agent, the elasticity of the hardened coating film might be improved by reducing the binding agent content and/or increasing the plasticizer content. In practical testing, however, difficulties arise with regard to curing, because if the polyisocyanate content is too low, the curing of the composition would require an exceedingly long period of time, on the one hand, and on the other hand the cure might be inadequate, so that the coating might be still sticky after a curing time of 10 hours and more.

Setting out from this knowledge, the present invention has the object of overcoming the above-described and other disadvantages of known coating compositions. In particular it is the object of the present invention to prepare a moisture-hardening one-component coating composition which will give a colored, light-resistant and highly elastic coating film which provides excellent adhesion to flexible substrates. Even in a coating thickness of only 50 micrometers good covering power is to be obtained, which will be capable of reliably protecting even delicate materials such as soft polyurethane foams against degradation by the action of visible light and/or ultraviolet light. The coating must furthermore be weather resistant and if necessary protect the substrate against mechanical damage.

The solution of this problem according to the invention is a moisture-hardening one-component coating composition for flexible substrates, which has the following composition:
- 35–60 wt.-% of a mixture consisting of hexamethylene diisocyanate prepolymer and toluylene diisocyanate prepolymer in a ratio of from 54 to 68 parts by weight of the former to 32 to 46 percent by weight of the latter,
- 8–15 wt.-% plasticizer,
- 0.3–2 wt.-% anti-settling agent,
- 2–10 wt.-% flaky extender,
- 5–25 wt.-% colorant pigment,
- 1–3 wt.-% moisture binding agent, and
- 10–20 wt.-% aliphatic ester.

The coating composition according to the invention yields colored coatings after hardening which even in comparatively light coating thickness of only 50 micrometers give absolute coverage and have high resistance to light. The cured coating films have an unusually high elasticity, elongation and adherence to the substrate, so that a flexible substrate can be folded or creased without any tearing of a coating formed from the coating composition according to the invention, or any spalling or other damage. For example, a metal foil corresponding to the mandrel bending test according to DIN 53 152 could be bent around a mandrel with a diameter of 1 mm without cracking, separation or other damage to the coating film 50 micrometers thick adhering to the metal foil.

The coating composition according to the invention yields weather-resistant protective coatings with good resistance to sea water and chemicals. The cured coatings have excellent light and weather resistance and protect the substrate against degradation by the action of visible or ultraviolet light.

The coating composition according to the invention can be applied in great coating thicknesses and cures without problems. For example, for the sealing and/or renovation of roofs covered with roofing paper, the coating composition according to the invention can be applied in a single operation in a thickness of 2 mm and more. A coating about 2 mm thick is cured within about 8 to 10 hours under standard conditions (20° C., 80% relative atmospheric humidity) to such an extent that, if necessary, a second coat could be applied; after about 48 hours the coating is completely cured and can be walked on.

The coating composition according to the invention can be used in a wide temperature range; for example, it is temperature resistant in the range from −30° C. to +150° C. Curing takes place without problems in the temperature range from −5° C. to a long-lasting temperature of 50° C.

The cured coating, due to its good strength of adhesion and high elasticity, adheres to the greatest variety of flexible substrates, such as soft and hard foams, artificial leather, plastic films, metal foils, paper, cardboard, roofing felt, aluminum foils, steel surfaces, concrete and the like. Furthermore the cured protective coating has good resistance to abrasion and, especially in greater thickness of 100 micrometers and more, protects the substrate against mechanical damage. In this regard the coating composition according to the invention can be used, for example, for the interior coating of silo installations, salting trucks and other such steel surfaces which in their intended use will be exposed to impact and the scouring action of particles.

Because the coating composition according to the invention is prepared as a one-component system, it can be stored for a virtually unlimited time with the exclusion of moisture, and nevertheless hardens after application to the substrate simply by the access of air from the ambient atmosphere. If necessary, a coating about 80 micrometers thick prepared from the coating composition according to the invention can be second-coated with the same material after about 2 to 3 hours. After about 15 to 20 hours, even a great number of coats are completely cured and can be exposed to the intended stresses.

Also subject matter of the invention is a process for producing a colored, highly elastic protective coating on a flexible substrate, in which the one-component coating composition according to the invention is applied to the dirt-free, dust-free, and oil- and grease-free substrate and is allowed to cure by the access of moisture from the ambient atmosphere.

In the case of a single, one-time application, the coating composition according to the invention is applied in a thickness of at least 50 micrometers. In this case a colored finish coat of high covering power and high resistance to light is obtained.

Preferred applications of the coating composition according to the invention relate to the production of a colored, light-resistant coating of good adhesion and high elasticity on a flexible substrate. The substrate can consist of a great variety of materials, as stated above. On account of the high elasticity and excellent strength of adhesion, no cracking, spalling or other damage occurs in the cured coating film, even if the substrate is sharply bent or creased. For the coating of concrete surfaces the pore-filling property is important. Even if the concrete "works" under alternating temperature stress, the pore filling produced by the coating composition according to the invention is sustained by its elasticity and adhesion. In addition, the concrete is given protection against weathering.

The invention will be explained in detail below in conjunction with preferred embodiments.

The coating composition according to the invention is characterized by a content of the following necessary components in the stated proportions; the percentages refer to the total weight of the coating composition.

35 to 60 wt.-% isocyanate prepolymer,
8 to 15 wt.-% plasticizer
0.3 to 2 wt.-% antisettling agent,
2 to 10 wt.-% flaky extender,
5 to 25 wt.-% coloring pigment,
1 to 3 wt.-% moisture binding agent, and
10 to 20 wt.-% aliphatic ester.

Preferably, the coating composition additional contains 0.1 to 1 wtg.-% of common lacquer additives. Such lacquer additives include, but are not limited to, accelerators, leveling agents, de-airing agents, viscosity stabilizers, wetting agents, dispersion aids, antifloating agents and the like.

The coating composition can additionally contain 2 to 6 weight-percent of aromatic hydrocarbons. Such aromatic hydrocarbons include especially the various xylenes and, to a lesser extent, toluene. Usually the isocyanate prepolymers typically used in the paint industry are supplied already mixed with such aromatic hydrocarbons. Preferably the finished coating composition is to contain a very small amount of such aromatic hydrocarbons.

The isocyanate prepolymers or polyisocyanates are diisocyanates and triisocyanates in commercial form. For example, the group of polyisocyanates sold under the commercial name, "Desmodur," are very suitable. Good results have been achieved with polyisocyanates on the basis of toluene diisocyanate, and either 2,4- or 2,6-toluylene diisocyanates or the common commercial isomer mixture can be used. Furthermore, the polyisocyanate on the basis of hexamethylene-1,6-diiso- cyanate can be used. The polyisocyanate on the basis of diphenylmethane-4,4'-diisocyanate also widely used in the paint industry is less desirable because it impairs the light-resistance of the protective coating.

In the scope of the present invention it has been recognized that the elasticity of the cured coating, which is so important to adhesion to flexible substrates, in addition to other factors, such as the presence of certain plasticizers and the selection of suitable pigments in certain proportions, can be assured especially by the use of a mixture of different polyisocyanates. Preferably, therefore, the polyisocyanate that is used in the scope of the present invention consists of a mixture of different polyisocyanates. A mixture of different polyisocyanates is had when the components of the mixture are different in type of structure and/or in their content of isocyanate groups.

Good results have been obtained, for example, with a mixture of toluylene diisocyanate prepolymer and hexamethylene-1,6-diisocyanate prepolymer. Either 2,4- or 2,6-toluylene diisocyanate prepolymer can be used as the toluylene diisocyanate prepolymer, or the common commercial isomer mixture, which is especially attractive from the cost viewpoint. It is desirable to use a slight excess of hexamethylene diisocyanate prepolymer in a mixture of these diisocyanate prepolymers.

In the framework of the invention it has been learned that not only the nature of the isocyanate but also its content of isocyanate groups has effects on the elasticity of the cured coating. Especially good results were obtained with a polyisocyanate which consisted of a mixture of toluylene diisocyanate prepolymer and hexamethylene diisocyanate prepolymer, in which case the toluylene diisocyanate prepolymer contained, with respect to its weight, 3 to 4% of isocyanate groups, and the hexamethylene diisocyanate preopolymer contained, with respect to its weight, 8 to 10% of isocyanate groups, and 100 parts of this diisocyanate mixture contained 68 to 54 parts of hexamethylene diisocyanate prepolymer, balance toluylene diisocyanate prepolymer.

A diisocyanate mixture of this kind is especially preferred in the scope of the invention. The proportion of this mixture is preferably 38 to 44% of the total weight of the coating composition.

As another necessary component, the coating composition according to the invention contains one or more plasticizers. These are the plasticizers commonly used in the paint industry. Usable polymers include the group of the soft acrylate resins, such as for example a known copolymer of butyl acrylate and vinyl isobutyl ether. Preferably plasticizers with a flame-retardant action are used. Especially good results were obtained with phosphoric acid esters; examples of these are diphenyl cresol phosphate, diphenyl octyl phosphate, tricresyl phosphate and comparable phosphates, without limitation thereto. Phosphoric acid esters such as these are used preferably as plasticizers.

Antisettling agents for coating compositions of the kind considered herein are known to those skilled in the art; known antisettling agents which can be used in connection with the present invention include, for example, montmorillonite, silica, hydrogenated castor oil, and the like.

Flaky extenders and fillers are also known. Among the common flaky extenders which can be used in connection with the present invention are, for example, talc, barium sulfate, flake pigments, especially flake pigments on the basis of silicon-aluminum oxides and comparable fillers. The extenders contemplated according to the invention are to be low in, and preferably free from, components which yield carbonate and/or carbon dioxide, so that, when mixed with polyisocyanate, a long shelf life will be assured.

Colorant pigments for the coating compositions of the kind considered herein are also known to those skilled in the art. These pigments especially assure the light reflecting and heat reflecting ability of the protective coating and give the latter a particular color. Suitable colorant pigments are available, for example, under the commercial names, "heliogen pigments," "paliotol pigments," "sicomine pigments," and the like. Other suitable pigments include carbon black, titanium dioxide, etc.

The colorant pigment content can amount to 5 to 25% of the total weight of the coating composition; a pigment content of 9 to 22 wt.-% is preferably provided. Within these limits the pigment content depends on a number of considerations. Many pigments, especially different types of carbon black and various bronzes, exercise a hardening action on compositions of the kind contemplated herein. A high content of these pigments impairs the elasticity of the cured coating and can cause embrittlement of the coating. The carbon black and bronze pigment content is therefore preferably kept in the lower range within the limits provided according to the invention. Within these limits, however, higher contents of inorganic pigments result in better paint coverage and greater color brilliance. The use of the aluminum pigments so widely used in the paint industry is less desirable because they increase the hardness of the cured coating and would reduce its elasticity.

As agents for binding or withdrawing moisture, finely divided natural and synthetic zeolites can be used, such as for example the Zeolith-L paste sold by Bayer AG, and also molecular sieves of aluminum and silica compounds, which in some cases contain a titanium additive. Also, agents which bind water chemically can be provided, such as monoisocyanates, for example. Such moisture-binding and moisture-withdrawing agents are known to those skilled in the art and are commercially available.

As an additional necessary component, the coating composition according to the invention contains 5 to 10% by weight of aliphatic esters or a mixture of such esters. These esters are to extend the binding agent (plain dissolvers), assure the required working viscosity and attack the partly solvent-sensitive substrate sufficiently, but not excessively; for example, they prevent the "bleed-through" of asphalted felt. They are especially the esters of carboxylic acids of one to three carbon atoms with low univalent or polyvalent aliphatic alcohols. Preferably, aliphatic esters with two or more ester groups per molecule are used, whose molecular weight is within the range of 120 to 180. In this regard especially good results have been obtained with glycol acetates, which therefore are used preferably as aliphatic esters.

To obtain a moisture-hardening one-component coating composition of long shelf life, the individual components are to be substantially free of components containing active hydrogen atoms, particularly those present in water and hydroxyl groups. The aliphatic esters, the plasticizer and the indispensable vehicle for antisettling agents and moisture-binding agents are therefore to be thoroughly free of water and free of hydroxyl groups.

The preparation of the coating composition according to the invention can be performed by methods commonly employed in the paint industry. Usually the components are placed in a boiler in the proper proportions and mixed by means of a high-speed stirrer or dissolver. A dispersion adjuvant provided among the paint additives prevents excessive frothing. It has been found desirable to combine the mixture of isocyanate prepolymer together with the aliphatic ester in the boiler and then add the rest of the components successively, adding the moisture-binding agent at the end. A stirring time of about 10 to 20 minutes at room temperature is sufficient. Finally a self-leveling, structurally viscous composition is obtained which is ready to use in this form.

In case of necessity the coating composition can be stored away, in which case the shelf life at room temperature amounts to at least 6 months. Some samples have been stored for more than 12 months without any detectable increase in viscosity and/or decrease in reactivity.

Since the coating composition according to the invention is a one-component system, it has no appreciable pot life. After opening the storage container the material is to be applied immediately, because otherwise it will skin over and gradually react due to the access of atmospheric humidity.

The preparation of the substrate surface for the first application of the coating composition according to the invention requires no special measures; it is sufficient if the surface is free of dirt, dust, grease and oil. If necessary a slight roughening may be desirable. The coating composition according to the invention can be applied to a moist, but not wet, surface without thereby impairing the setting and curing or the quality of the finished protective coating.

The coating composition can be applied to the substrate by conventional methods, for example with a brush or by spraying; high-pressure airless spraying, for example, has proven practical.

The coating composition is applied to the substrate in a thickness of at least 50 micrometers; in the individual case the coating thickness can depend on the substrate material and/or on the purpose. On smooth or embossed artificial leather, e.g., for shoes, binder covers and briefcases, coating thicknesses on the order of about 50 to 100 micrometers are used. For typical plastic films, of polyester or vinyl, lesser thicknesses on the order of about 20 to 60 micrometers suffice. Although the coating composition according to the invention can be applied in several coats, thicknesses of up to only about 2 mm are applied preferably in a single application. Under ordinary conditions an 80 micrometers thick coating, for example, dries in about 2 to 3 hours, and after about 15 to 20 hours is fully hardened and can be exposed to the intended stress. After weathering and/or aging, even over a period of a year and longer, the film obtained from the coating composition according to the invention can be recoated easily with the same material.

After the coating composition has been applied to the substrate it hardens automatically under the action of atmospheric moisture without the need for special measures.

As previously stated, the coating composition according to the invention yields a colored coating of high covering power with an especially high elasticity. Therefore the coating composition according to the invention is especially suitable for the coating of flexible substrates which are to be given a colored coating. In addition, the coating composition according to the invention can be used for protection against weathering, even as a finish coat over coatings for resistance to corrosion from sea water and aggressive chemicals. In this connection the coating composition can be used for the production of a colored coating on aluminum extrusions and chromium plated parts, for example on window frames, on boat trim and the like. On account of its high resistance to abrasion, surfaces subject to severe mechanical stress can also be treated. As a rule, when applied to metal the coating is to be on the order of 50 to 200 micrometers thick.

Another application concerns the coating of hard and soft foams, made of polyurethane for example, such as are often used for insulating purposes. Here the thicknesses usually amount to about 50 to 100 micrometers. Polyurethane hard or soft foams coated in this manner have been used, for example, as insulating materials in diving bells.

The coating compositions according to the invention can furthermore be used for the sealing and/or renovation of roofs covered with roll roofing. In this case the coating composition can be applied in the amount of 200 to 400 grams per square meter. If the coating thicknesses greatly exceed 2 mm, application in two coats is preferred.

Furthermore, the coating compositions according to the invention are used for the coating of tarpaulins, such as those typically used for covering truck bodies; even in the case of this kind of severely stressed flexible substrate, the film has adhered excellently and, even after months of use, there has been no cracking or wearing through of the colored finish coating.

Still another use is the coating of concrete surfaces. Coating thicknesses of 100 to 300 micrometers provide nonporous finishes that are weather-resistant for many years and provide sufficient permeability to water vapor.

We claim:

1. A moisture hardening one-component coating composition for flexible substrates, containing
35-60 wt.-% of a mixture consisting of hexamethylene diisocyanate prepolymer and toluylene diisocyanate prepolymer in a ratio of from 54 to 68 parts by weight of the former to 32 to 46 percent by weight of the latter,
8-15 wt.-% plasticizer,
0.3-2 wt.-% anti-settling agent,
2-10 wt.-% flaky extender,
5-25 wt.-% colorant pigment,
1-3 wt.-% moisture binding agent, and
10-20 wt.-% aliphatic ester.

2. A coating composition according to claim 1, containing 38 to 44 weight-% of isocyanate prepolymer.

3. A coating composition according to claim 1 or 2, containing 9 to 22 weight-% of colorant pigment.

4. A coating composition according to claim 1 or 2 additionally containing 0.2 to 1 weight-% of laquer additives.

5. A coating composition according to claim 1 or 2, additionally containing 2 to 6 weight-% of aromatic hydrocarbons.

6. A coating composition according to claim 1, wherein the hexamethylene diisocyanate prepolymer contains, with respect to the isocyanate weight, 8 to 10 percent of isocyanate groups.

7. A coating composition according to claim 1, wherein the toluylene diisocyanate prepolymer contains, with respect to the isocyanate weight, 3 to 4% of isocyanate groups.

8. A coating composition according to claim 1, wherein the plasticizer is a phosphoric acid ester.

9. A coating composition according to claim 1, wherein the aliphatic ester contains two or more ester groups per molecule and has a molecular weight in the range of from 120 to 180.

10. A coating composition according to claim 1, wherein the aliphatic ester is a glycol acetate.

11. A coating composition according to claim 1, wherein a film obtained after curing of the coating composition is highly elastic, such that a 50 micrometers thick coating film adhering to a metal foil does not break or spall off when the metal foil is bent about a 1 mm thick mandrel in accordance with a mandrel bending test according to DIN 53 152.

12. A method of providing a colored, highly elastic protective coating on a flexible substrate, comprising the steps of: applying to the substrate a moisture-hardening one-component coating composition containing:
35-60 wt.-% of a mixture consisting of hexamethylene diisocyanate prepolymer and toluylene diisocyanate prepolymer in a ratio of from 54 to 68 parts by weight of the former to 32 to 46 percent by weight of the latter,
8-15 wt.-% plasticizer,
0.3-2 wt.-% anti-settling agent,
2-10 wt.-% flaky extender,
5-25 wt.-% colorant pigment,
1-3 wt.-% moisture binding agent, and
10-20 wt.-% aliphatic ester,
and allowing the coating to cure by access to moisture in ambient atmosphere.

13. A method according to claim 12, wherein the coating composition is applied in a coating having a thickness of at least 50 micrometers.

14. A method according to claim 12, wherein the substrate is roofing felt, and wherein the coating composition is applied in an amount of 200 to 400 grams per square meter for sealing and/or renovation of roofs covered with the roofing felt.

15. In combination:
a flexible substrate; and a coating on said substrate, said coating having a thickness of at least 50 micrometers, and containing
35-60 wt.-% of a mixture consisting of hexamethylene diisocyanate prepolymer and toluylene diisocyanate prepolymer in a ratio of from 54 to 68 parts by weight of the former to 32 to 46 percent by weight of the latter,
8-15 wt.-% plasticizer
0.3-2 wt.-% anti-settling agent,
2-10 wt.-% flaky extender, 5-25 wt.-% colorant pigment,
1-3 wt.-% moisture binding agent, and
10-20 wt.-% aliphatic ester.

16. The combination of claim 15, wherein the substrate is metal, and the coating has a thickness of 50 to 200 micrometers.

17. The combination of claim 15, wherein the substrate is a plastic film and the coating has a thickness of 50 to 100 micrometers.

18. The combination of claim 15, wherein the substrate is polyurethane hard or soft foam and the coating has a thickness of 50 to 100 micrometers.

19. The combination of claim 15, wherein the substrate is a concrete surface and the coating has a thickness of 100 to 300 micrometers.

* * * * *